United States Patent
Bernal et al.

(10) Patent No.: US 9,736,493 B2
(45) Date of Patent: Aug. 15, 2017

(54) SYSTEM AND METHOD FOR ACHIEVING COMPUTATIONALLY EFFICIENT MOTION ESTIMATION IN VIDEO COMPRESSION BASED ON MOTION DIRECTION AND MAGNITUDE PREDICTION

(71) Applicant: Xerox Corporation, Norwalk, CT (US)

(72) Inventors: Edgar A. Bernal, Webster, NY (US); Qun Li, Chicago, IL (US); Stuart Schweid, Pittsford, NY (US); Wencheng Wu, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 162 days.

(21) Appl. No.: 14/541,550

(22) Filed: Nov. 14, 2014

(65) Prior Publication Data
US 2016/0142727 A1  May 19, 2016

(51) Int. Cl.
| | |
|---|---|
| *H04N 7/12* | (2006.01) |
| *H04N 11/02* | (2006.01) |
| *H04N 11/04* | (2006.01) |
| *H04N 19/57* | (2014.01) |

(52) U.S. Cl.
CPC .................................. *H04N 19/57* (2014.11)

(58) Field of Classification Search
None
See application file for complete search history.

(56) References Cited

U.S. PATENT DOCUMENTS

| 6,081,209 A * | 6/2000 | Schuyler ................. H03M 7/30 341/51 |
|---|---|---|
| 2002/0072847 A1 | 6/2002 | Trajkovic et al. |
| 2014/0169469 A1 | 6/2014 | Bernal et al. |

OTHER PUBLICATIONS

Bailo, G. et al., "Search Window Estimation Algorithm for Fast and Efficient H.264 Video Coping with Variable Size Block Configuration," 4 pages.

Bailo, G. et al., "Search Window Size Decision for Motion Estimation Algorithm in H.264 Video Coder," 2004 International Conference on Image Processing Oct. 24-27, 2004, 3:1453-1456.

(Continued)

*Primary Examiner* — Chikaodili E Anyikire
(74) *Attorney, Agent, or Firm* — Kermit D. Lopez; Luis M. Ortiz; Ortiz & Lopez, PLLC (57) ABSTRACT

Block-based motion estimation of video compression estimates the direction and magnitude of motion of objects in the scene in a computationally efficient manner and accurately predicts the optimal search direction/neighborhood location for motion vectors. A system can include a motion detection module that detects apparent motion in the scene, a motion direction and magnitude prediction module that estimates the direction and magnitude of motion of the objects detected to be in motion by the motion detection module, and a block-based motion estimation module that performs searches in reduced neighborhoods of the target block according to the estimated motion by the motion direction and magnitude prediction module and only for the blocks determined to be in motion by the motion detection module. The Invention is particularly well suited for stationary traffic cameras that monitor roads and highways for traffic law enforcement purposes.

20 Claims, 11 Drawing Sheets

(56) References Cited

OTHER PUBLICATIONS

Kuo, C.-M. et al., "A Novel Prediction-Based Directional Asymmetric Search Algorithm for Fast Block-Matching Motion Estimation," IEEE Transactions on Circuits and Systems for Video Technology (2009) 19(6):893-899.
Liang, T.-Y. et al., "Adaptively Asymmetric Pattern Search for Fast Block-Matching Motion Estimation," Proceedings of the Seventh IEEE International Symposium on Multimedia (ISM'05) Dec. 12-14, 2005, 7 pages.
Lin, Y.-C. et al., "Fast Full-Search Block-Matching Algorithm for Motion-Compensated Video Compression," IEEE Transactions on Communications (1997) 45(5):527-531.
Myers, T., "High-Definition Video Over IP—Enhancing Visual Information for Improved Traffic Flow and Incident," http://ezinearticles.com/?High-Definiton-Video-Over-IP--Enhancing-Visual-Information-For-Improved-Traffic-Flow-and-Incident&id=4892960, submitted Aug. 19, 2010, 4 pages.
Richardson, I. E., The H.264 Advanced Video Compression Standard (2003) John Wiley & Sons Ltd., West Sussex, England, available for viewing at: http://books.google.com/books?hl=en&lr=id=n9YVhx2zgz4C&oi=ind&pg=PR7&dg=video+compression&ots=8Z4MUwfF17&sig=C2xrsHgflhTtqIUnS_wM7ViyHEI#v=onepage&q=video%20compression&f=false.
Sarwer, M. G. et al., "An Efficient Search Range Decision Algorithm for Motion Estimation in H.264/AVC," International Journal of Circuits, Systems and Signal Processing (2009) 3(4):173-180.

* cited by examiner

SYSTEM AND METHOD FOR ACHIEVING COMPUTATIONALLY EFFICIENT MOTION ESTIMATION IN VIDEO COMPRESSION BASED ON MOTION DIRECTION AND MAGNITUDE PREDICTION

TECHNICAL FIELD

Embodiments are related to video compression. In particular, embodiments relate to systems and methods that can achieve computationally efficient motion estimation for video compression based on motion direction and magnitude prediction. More particularly, embodiments are related to systems and methods utilizing block-based motion estimation for efficient video compression that estimates the direction and magnitude of motion for objects in a scene.

BACKGROUND OF THE INVENTION

Block-based motion estimation is an important element in many video coding standards that aims at removing temporal redundancy between neighboring frames; yet, it is the most computationally expensive stage in traditional video compression methods. For example, traditional methods for block-based motion estimation such as the Exhaustive Block Matching Algorithm (EBMA) or the Full-Search Block Matching Algorithm (FSBMA) are capable of achieving good matching performance, but are computationally expensive. Alternatives to EBMA have been proposed to reduce the amount of search points within a search window by trading off matching optimally with computational resources. Since these algorithms only take into account a sub-region of the search space, they often achieve suboptimal results associated with local maxima.

Although traditional motion estimation algorithms exploit shared local spatial characteristics around the target block, they fail to take advantage of motion parameters that are easily detectable and measurable from video acquired with stationary cameras; in particular, presence/absence of apparent motion and direction of apparent motion can be estimated somewhat accurately and used to expedite the search process. Furthermore, attempts at computationally efficient block-based motion estimation that was both computationally efficient with capabilities to learn dominant spatio-temporal characteristics of motion patterns captured in the video required model construction, maintenance, and storage capabilities that translate into higher storage requirements.

What is needed are means for block-based motion estimation that is computationally efficient and that produces motion vectors that are semantically tuned with the motion in the scene, without significantly sacrificing matching performance relative to exhaustive methods.

In light of prior limitations, the present inventors herein disclose a system and method that provides the advantages of block-based motion estimation, white foregoing motion model construction, update and storage, by estimating local patterns of motion based on incoming frames.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, a feature of the disclosed embodiments to provide for a system in accordance with features of the present invention that can include providing a camera capturing video in association with a computer including a motion detection module, motion direction and magnitude prediction module, and a block-based motion estimation module.

It is yet another feature of the disclosed embodiments to provide for carrying out methods in accordance with features of the present invention that can include: providing a camera capturing video in association with a computer including a motion detection module, motion direction and magnitude prediction module, and a block-based motion estimation module, wherein the motion detection module that detects apparent motion in the scene, the motion direction and magnitude prediction module that estimates the direction and magnitude of motion of the objects detected to be in motion by motion defection module, and the block-based motion estimation module that performs searches in reduced neighborhoods of the reference block displaced from the target block according to the estimated motion by the motion direction and magnitude prediction module for the blocks determined to be in motion by the motion detection module.

It is another feature of the disclosed embodiments to provide for carrying out methods in accordance with features of the present invention that can significantly improve reconstruction errors/prediction capabilities for a given search neighborhood size relative to traditional algorithms.

It is another aspect of the disclosed embodiments to provide for carrying out methods in accordance with features of the present invention that can significantly reduce computational complexity for a given prediction error relative to traditional algorithms.

It is another feature of the disclosed embodiments to provide for carrying out methods in accordance with features of the present invention wherein magnitude of motion vectors are not bounded by size of search neighborhood.

It is another feature of the disclosed embodiments to provide for carrying out methods in accordance with features of the present invention wherein the systems and methods produce more semantically meaningful motion vector fields that can be used to perform higher-level analysis tasks, compared to traditional algorithms.

It is another feature of the disclosed embodiments to provide systems and methods that provide the advantages of block-based motion estimation, while foregoing motion model construction, update and storage by estimating local patterns of motion based on incoming frames.

It is another feature of the disclosed embodiments to provide systems and methods carrying out in accordance with features of the present invention that can be applied to enhance at least one of video compression and decompression that enable efficient vehicle event-driven searches, vehicle counting from compressed video streams, stop sign and traffic light law enforcement from compressed video streams, video-based vehicle speed estimation from compressed video streams, video-based vehicle classification from compressed video streams, right turn on bus lanes law enforcement for passenger vehicles from compressed video streams, and efficient, learning-based motion estimation in regularized environments.

BRIEF DESCRIPTION OF THE DRAWINGS

The accompanying figures, in which like reference numerals refer to identical or functionally-similar elements

FIGS. 3 (a-b) illustrate (a) a reference block and search window in reference frame and (b) a target block in target frame;

FIGS. 4 (a-c) includes example block-based motion estimation algorithm results: (a) reference frame, (b) target frame, and (c) resulting motion vector field;

FIGS. 7 (a-e) illustrate motion detection results of: 7(a) n-th video frame, 7(b) resulting motion mask, 7(c) n−1-th, 7(d) n-th intermediate motion masks, and 7(e) grey-scale coded mask illustrating relationship between the masks in FIGS. 7(c) and 7(d);

FIGS. 8 (a-c) illustrate motion detection results with a higher threshold than that used in FIG. 5; (a) n−1-th and (b) n-th intermediate motion masks, where FIG. 8(e) is a grey-scale coded mask illustrating relationship between the masks in FIGS. 8(a) and 8(b);

FIGS. 9 (a-b) illustrate a Block-matching algorithm in a proposed system: (a) reference block and search window in reference frame centered around the location dictated by the displacement vector, and (b) target block in target frame;

DETAILED DESCRIPTION

The particular values and configurations discussed in these non-limiting examples can be varied and are cited merely to illustrate at least one embodiment and are not intended to limit the scope thereof.

Figure 1:
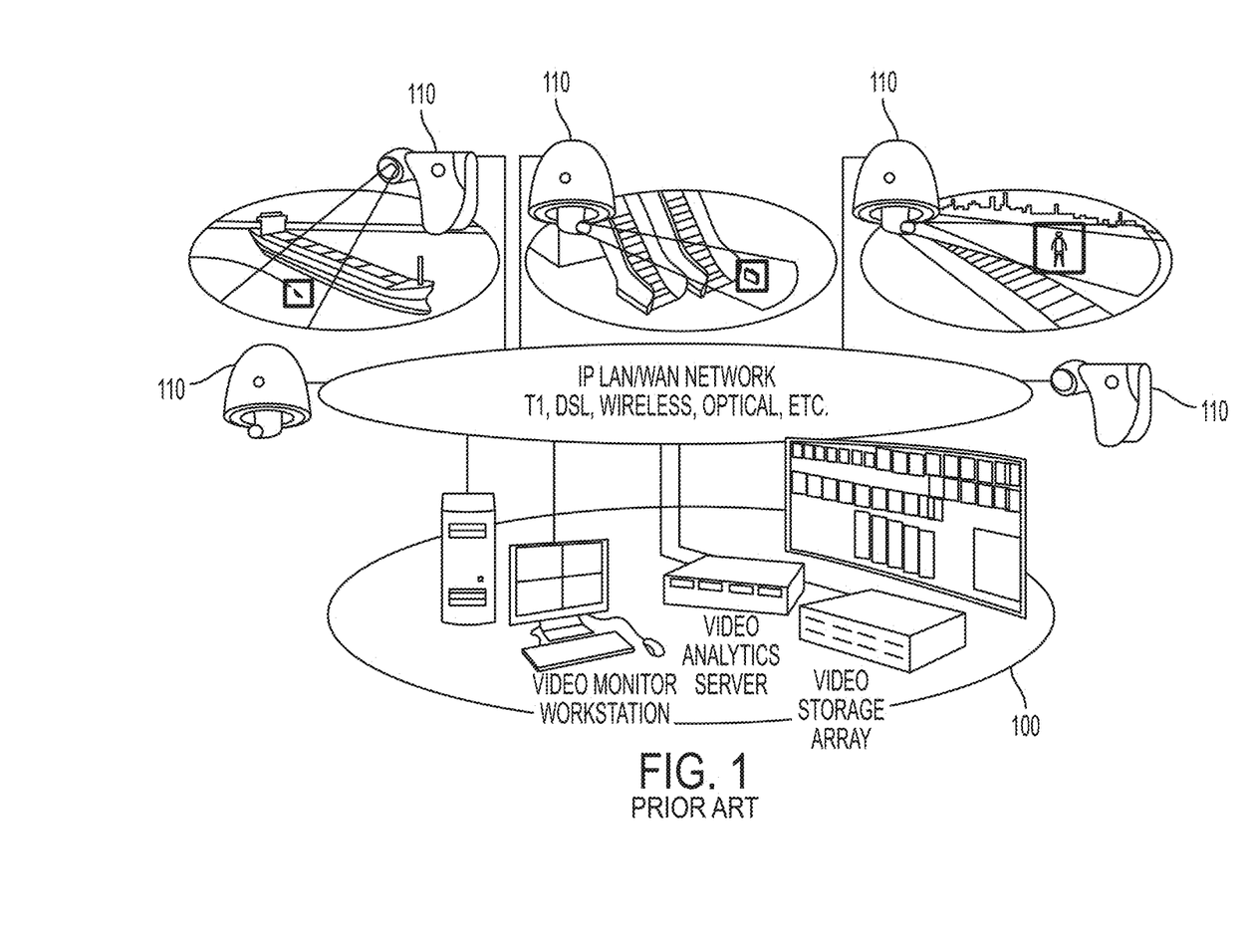
FIG. 1 illustrates a sample camera network system.

Video compression is essential in applications where high quality video transmission and/or archival is required. Consider a surveillance system with a set of dome cameras 110 that relay video data to a central processing and archival facility 100 as illustrated in FIG. 1 (labeled as "Prior Art"). While a communication network used to transport the video stream between the cameras and the central facility may be built on top of proprietary technology, traffic management centers have recently started to migrate to Internet Protocol- or IP-compliant networks. Whichever the case may be, the underlying communication network typically has bandwidth constraints which dictate the use of video compression techniques on the camera end, prior to transmission.

In the case of legacy analog cameras, compression is performed at an external encoder attached to the camera, whereas digital cameras typically integrate the encoder within the camera itself. Typical transmission rates over IP networks require the frame rate of multi-megapixel video streams to be limited to fewer than 5 frames per second (fps). The latest video compression standards enable the utilization of the full frame rate camera capabilities for transmitting high definition video at the same network bandwidth. For example, transmission of 1080p HD uncompressed video requires a bandwidth of 1.5 Gbps, while its compressed counterpart requires only 250 Mbps; consequently, transmission of compressed video with 8 times the frame rate of the uncompressed version would be possible over the same network infrastructure.

Figure 2:
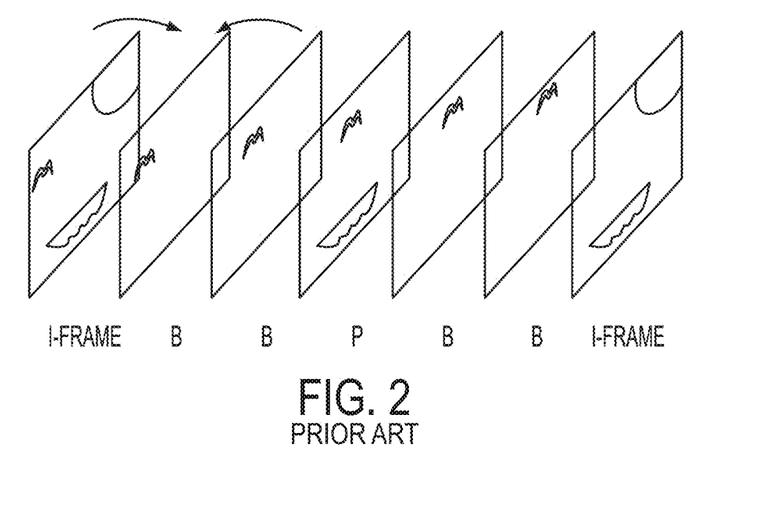
FIG. 2 illustrates reference (I-) and non-reference (P- and B-) frames in video compression.

Video compression is achieved by exploiting two types of redundancies within the video stream: spatial redundancies amongst neighboring pixels within a frame, and temporal redundancies between adjacent frames. This modus operandi gives raise to two different types of prediction, namely infra-frame and inter-frame prediction, which in turn results in two different types of encoded frames, reference and non-reference frames, as depicted in FIG. 2 (labeled as "Prior Art"). Reference frames, or I-frames are encoded in a standalone manner (intra-frame) using compression methods similar to those used to compress digital images. Compression of non-reference frames (P- and B-frames) entails using inter-frame or motion-compensated prediction methods where the target frame is estimated or predicted from previously encoded frames in a process that typically entails three steps: motion estimation, residual calculation, and compression.

In the motion estimation stage, motion vectors are estimated using previously encoded frames. The target frame is segmented into pixel blocks called target blocks, and an estimated or predicted frame is built by stitching together the blocks from previously encoded frames that best match the target blocks. Motion vectors describe the relative displacement between the location of the original blocks in the reference frames and their location in the predicted frame. While initial estimation of P-frames utilizes the video in previous frames exclusively, previous and future frames are typically used to predict B-frames. In the residual calculation stage, the error between the predicted and target frame is calculated. In the compression stage, the error residual and the extracted motion vectors are compressed and stored. The target frame can be recovered during decompression from knowledge of the estimated motion vectors, the error residual, and the reference frames involved in the compression process.

Figure 3A:
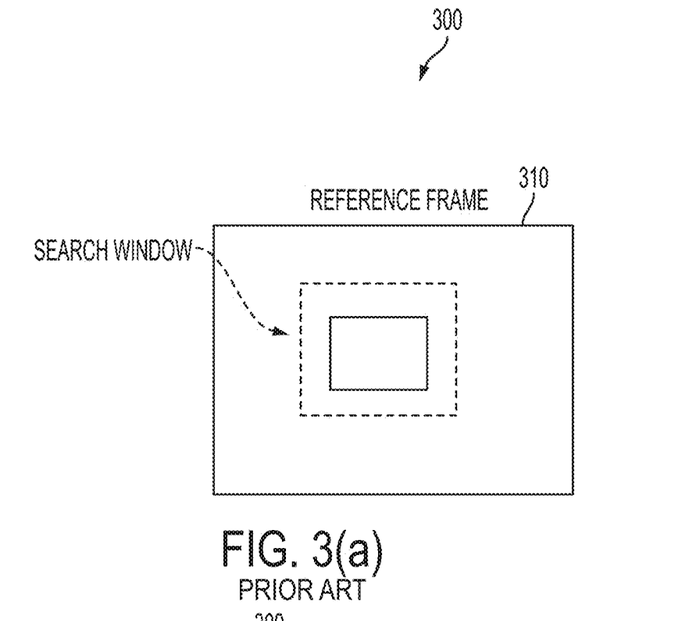
Figure 3B:
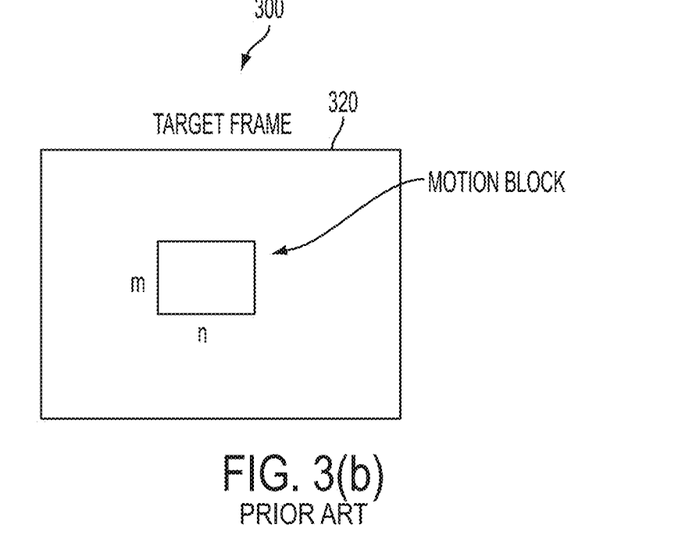

The block-based motion estimation process estimates motion vectors corresponding to the apparent motion between the target frame and the reference frame. FIGS. 3 (a-b) (labeled as "Prior Art") depict a graphical description 300 of the search neighborhoods involved in a traditional block matching algorithm. FIG. 3(a) depicts a reference block and search window in a reference frame 310. FIG. 3(b) depicts a target block in a target frame 320.

The traditional block matching algorithm breaks up the frame to be compressed or target frame into pixel blocks of a predetermined size. The size of a motion block can be denoted by m×n pixels, where typically m=n=18. A search is performed in the reference frame for the block that is most similar to the current m×n target pixel block. Since searching and calculating similarity metrics is a computationally expensive process, a search window is typically defined around the location of the target motion block as shown in FIG. 3(a). Example similarity criteria between the blocks are the mean squared error (MSE, proportional to the $L_2$ norm) and the mean absolute difference (MAD, proportional to the $L_1$ norm), which are calculated as:

$$MSE(d_1, d_2, j) = \left(\frac{1}{mn}\right)\sum (B(k, l, j) - B(k + d_1, l + d_2, j - 1))^2 \quad (1)$$

$$MAD(d_1, d_2, j) = \left(\frac{1}{mn}\right)\sum |B(k, l, j) - B(k + d_1, l + d_2, j - 1)| \quad (2)$$

where B(k,l,j) denotes the pixel located on the k-th row and l-th column of the m×n block of pixels in the j-th frame. The summation is conducted over indices k and l. In this case, the (j−1)-th frame is the already encoded frame being used as a reference frame, and the j-th frame is the target frame. Since both MSE and MAD measure how dissimilar two blocks are, a block similarity measure can then be defined as the reciprocal or the negative MSE or MAD. The motion vector for the target pixel block is the vector ($d_1$, $d_2$) that maximizes the block similarity measure between the target and reference blocks. The search for the best matching block in the search window can be conducted using full extensive search, binary search, three step search, and spiral search algorithms, etc.

Figure 4A:
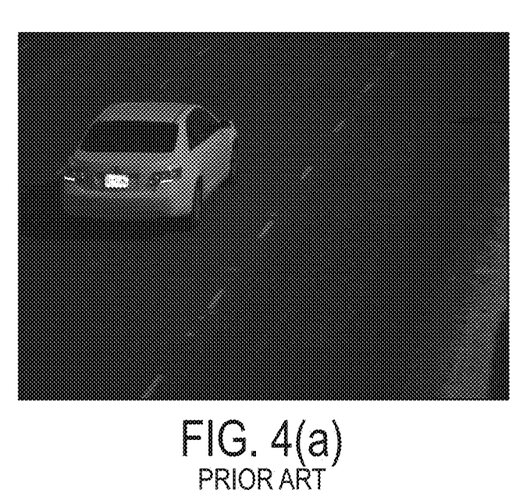
Figure 4B:
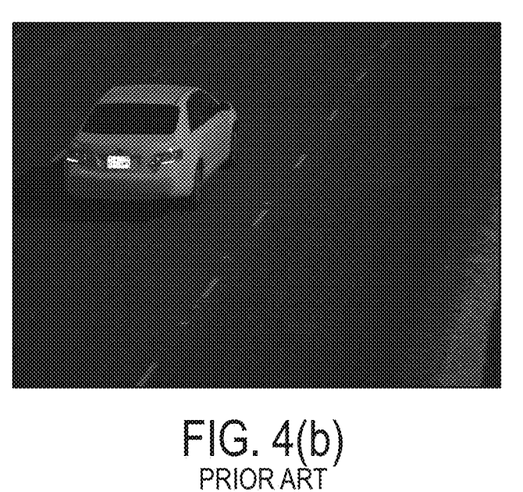
Figure 4C:
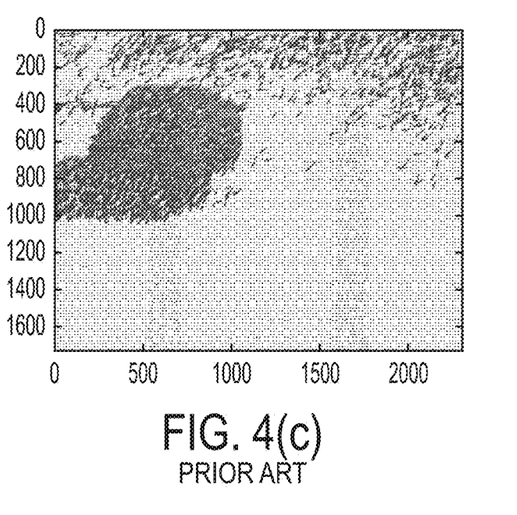

FIGS. 4 (*a-c*) (also labeled as "Prior Art") illustrate the results of block-based motion estimation on video with a spatial resolution of 1728×2304 pixels (4 Mpixel). FIG. 4(*a*) illustrates a photo representation of the reference frame. FIG. 4(*b*) illustrates a photo representation of the target frame, and FIG. 4(*c*) illustrates the resulting motion vector field obtained with a block size of 16×16 pixels and a search range of ±64 pixels along each direction. It is apparent that, while the vector field captures well the apparent motion between the target and reference frames, it also produces a significant amount of motion vectors on stationary areas. This is because traditional motion compensation approaches aim at minimizing distortion of the compressed stream, and so motion vectors may be introduced in stationary areas of the video feed if that results in a higher compression efficiency. This characteristic of motion vectors may sometimes be undesired, for example, in video analytics tasks that operate on the compressed stream and that perform motion analysis based on processing of the motion vectors.

Several methods have been proposed in the prior art to reduce the computational complexity in motion estimation module of video compression, which is the most computationally expensive module in video compression. Prior methods typically aim at generic videos and are therefore limited in terms of computational savings that can be achieved in the motion estimation module.

The present inventors, however, have developed a new system and method for efficient motion estimation for video sequences captured by a stationary camera with respect to a scene. For video captured with, for example, a traffic camera, the category under which most traffic cameras currently deployed fall short, the main cause of changes between adjacent frames corresponds to object motion. In this setting, the output from the motion compensation stage is the vector field describing the way pixel blocks move between adjacent frames. A motion vector field whose motion vectors are representative of the direction and magnitude of the apparent motion in the scene can be referred to as a "semantically meaningful" field. Note that this is not always the case (as illustrated by FIG. 4(*c*)), since motion vectors are computed to minimize reconstruction error and not to be descriptive of scene motion, which is the task that techniques such as optical flow attempt to solve. The downside of a not semantically meaningful vector field is that, depending on a given application, it may not be used to perform high-order level analytics (including speed estimation, object detection and counting, etc.).

Figure 5:
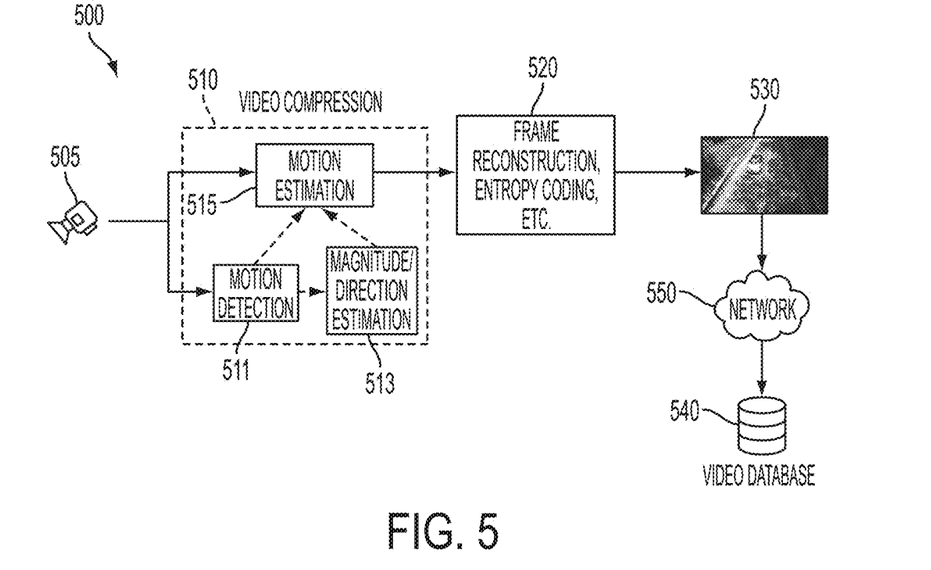
FIG. 5 illustrates a high-level overview of a system, in accordance with features of the present invention.
Figure 6:
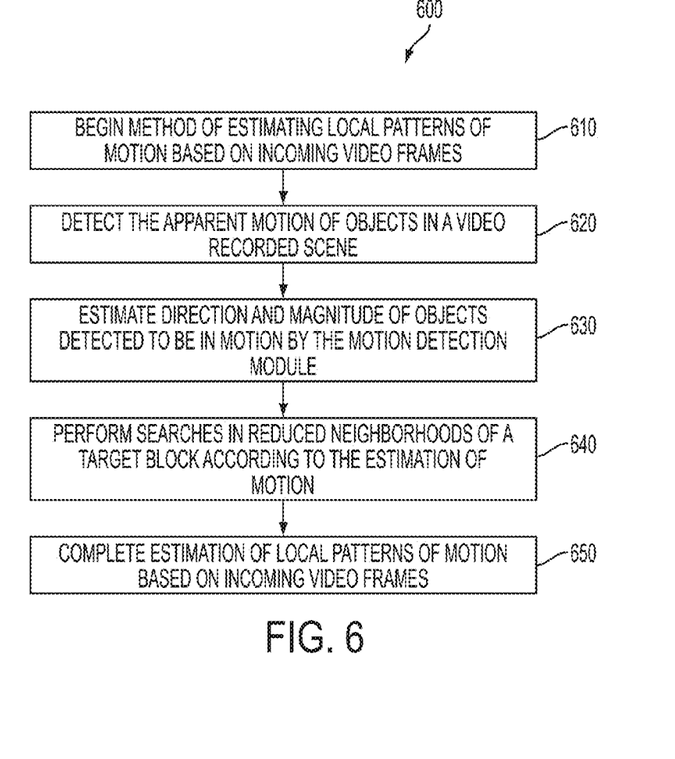

A high-level block diagram 500 overview as applied to compression of non-reference frames captured by a stationary camera is shown in FIG. 5. A camera 505 acquires video sequences of the region of interest, typically a street or highway. A video compression module 510 includes a motion detection module 511, a motion direction and magnitude prediction module (shown as magnitude/direction estimation) 513, and a motion estimation module 515, which together provide a compression algorithm executable by the camera 506 for performing motion estimation for non-reference frame compression. The video compression module can be implemented by a computer, which can be represented for purposes of this disclosure by the compression module 510. Once processed, video can go through a frame reconstruction, entropy coding module 520, can be viewed via a monitor 530, and can pass through a network 550 for storage in a database 540.

Figure 8A:
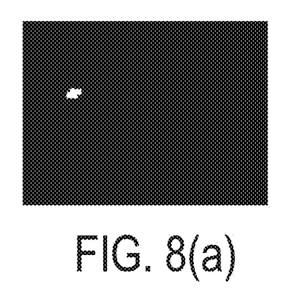
Figure 8B:
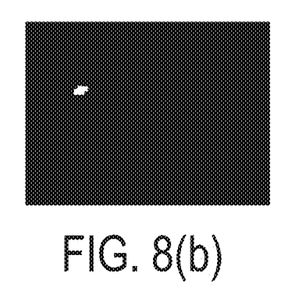
Figure 8C:
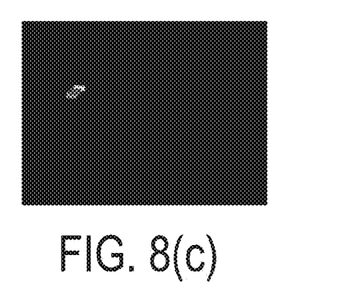
FIG. 8 illustrates a flow diagram 600 outlining method steps for determining motion that can be followed, in accordance with the teachings herein.

FIG. 8 illustrates a flow diagram 600 outlining method steps for determining motion that can be followed, in accordance with the teachings. A method of estimating local patterns of motion based on incoming video frames begins at block 610. Referring to block 620, a motion detection module detects the apparent motion of objects in a video recorded scene. As shown in block 630, a motion direction and magnitude prediction module estimates direction and magnitude of objects detected to be in motion by the motion detection module. Then, as shown in block 640, a block-based motion estimation module is included in the computer for performing searches in reduced neighborhoods of a reference block displaced from the target block according to the estimation of motion by the motion direction and magnitude prediction module. The method of estimating local patterns of motion based on incoming video frames is then completed as shown in block 650. It should be appreciated that, although a beginning and termination point is referenced in the flow diagram, the process can be ongoing while video is captured in a surveillance system. In other words, the cycle of analysis in blocks 620-640 can repeat or continue as new video frames are acquired.

As described in the previous section, a typical implementation of the compression algorithm performs searches within a search window around neighborhoods of the reference block displaced from the target blocks in already encoded frames for the best matching encoded block. The size of the search window can be fixed (e.g., 32×32 or 64×64 pixels) a priori. This computationally expensive search process is performed regardless of the location or motion characteristics of the particular target block. In the case of the stationary camera from FIG. 3, this process is unnecessarily inefficient for several reasons, including: (i) pixel blocks containing images of roadside locations will be predominantly static; and (ii) pixel blocks containing images of road portions will either capture vehicles moving in the direction of traffic or no motion at all when vehicles are not traversing the scene. Exceptions to these rules include illumination changes and small artificial motion introduced by environmental effects such as wind, rain, snow, changing shadows, etc. These exceptions, however, represent a minority of the cases.

The method proposed herein includes two stages that provide information relevant to the apparent motion characteristics in the scene to the motion estimation module. The first stage performs motion detection for all blocks and the second stage estimates the direction and approximate magnitude of the detected motion. The output of the motion detection stage designates the location of blocks for which motion should be estimated; the output of the motion direction estimation stage indicates the preferred direction/location along which to search for the best match for blocks that require motion estimation. Note that in order to accommodate potential errors in the initial estimation, neighborhoods of multiple pixels can be used for matching around the estimated displacement.

Figure 7A:
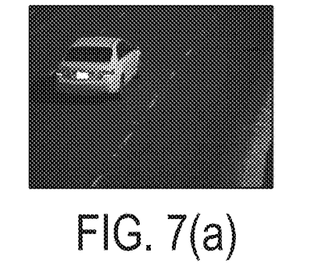
Figure 7B:
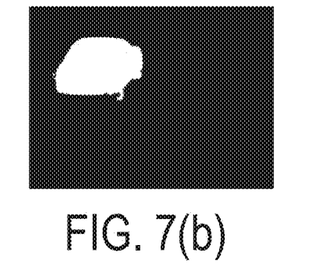
Figure 7C:
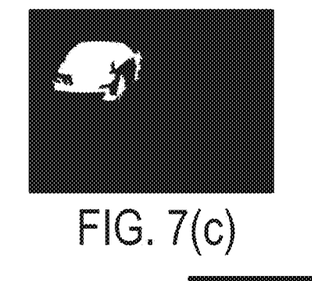
Figure 7D:
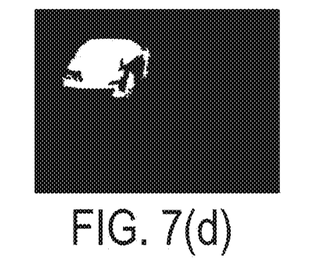

Implementation of the method would require minor additional processing with respect to the traditional video compression algorithm at the point of execution, be it the analog to digital converter in the case of analog cameras or the camera itself in the case of digital or IP cameras. A motion detection module employs computationally efficient techniques to detect apparent motion in the scene. In one embodiment, a temporal double frame differencing method may be employed. Specifically, in order to detect apparent motion at frame n, the pixel-wise difference between frame n and frame n−1 is computed, as well as that between frame n+1 and frame n, where n−1, n, and n+1 refer to temporal indices. Thresholding the resulting difference frames results in binary intermediate motion masks between which a pixel-wise logical 'AND' operation is performed to estimate the apparent motion corresponding to frame n. Since the resulting mask is typically noisy, morphological operations such as eroding, dilating, closing, opening, and hole filling are usually performed. FIG. 7(b) illustrates the resulting motion mask for the frame in FIG. 7(a). FIGS. 7(c) and 7(d) show the intermediate motion masks.

The discussion above applies a single threshold value to the difference frames to yield a single set of target regions (one representing the moving vehicle in the example of FIG. 7). However, in some embodiments it can be advantageous to apply multiple levels of thresholding to create layers of regions, each with its corresponding apparent motion, since this approach enables more efficient and customized searches with only a slight addition of computation. FIG. 8 illustrates the effect of applying a different threshold level to the difference frames compared to that used in FIG. 7. As shown in FIG. 8, the resulting motion region closely corresponds to the license plate region. By using multiple thresholds, multiple object regions can be segmented out. The finer segmentation illustrated by FIG. 7 and FIG. 8 is achieved with a simple two-level thresholding and does not rely on the use of license plate detection algorithms. An immediate benefit of this segmentation into sub-regions is that different levels of search refinement can be achieved: more refined, but still efficient searches in and around the license plate region (motion region in FIG. 8); less accurate, but very efficient searches for non-license plate regions (motion region in FIG. 7 not including motion region in FIG. 8); and extremely efficient or even circumvented searches in regions without any apparent motion (non-motion region in FIG. 7). Additionally, regions that have little or no apparent motion can be more highly compressed, as they are typically not of interest in transportation/surveillance applications. These compression characteristics are useful since in many transportation applications it is desired to retain the highest possible qualify for vehicle-identifying features such as license plates, which aid in identification and enforcement tasks. Our approach allows such customization with little to no additional computation.

Figure 7E:
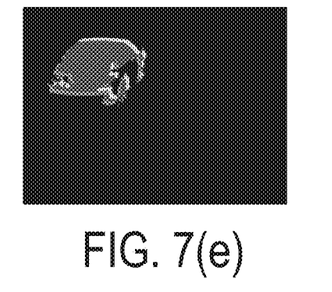

FIG. 7(e) depicts a grey-scale-coded mask illustrating the relationship between the intermediate motion masks shown in FIGS. 7(c) and (d): medium-grey pixels indicate pixels activated in the n−1-th mask only, lightest-grey pixels indicate pixels activated in the n-th mask only and darkest grey pixels indicate pixels activated in both masks. Intuitively, the illustrated displacement between the masks is indicative of the apparent motion of the vehicle associated with frame n. More specifically, the vector describing the pixel displacement between the blobs from the masks depicted in FIGS. 7(c) and 7(d) is a good indicative of the apparent motion associated with frame n. As such, it can be used to somewhat accurately target and refine search neighborhoods corresponding to motion vectors describing displacement between matching blocks when frame n−1 is used as a reference frame for the encoding of frame n, or when frame n is used as a reference frame for the encoding of frame n+1. For example, if vector $(d_x, d_y)$ describes the displacement between the centroid of the blob in the mask from FIG. 7(d) and that of the blob in the mask from FIG. 7(c), then a reduced search neighborhood centered at $(-d_x, -d_y)$ relative to each target block for all pixel blocks intersecting with the motion blob from FIG. 7(b) can be used to motion compensate those pixel blocks in frame n at compression relative to frame n−1. For all other pixel blocks, that is, for those not intersecting with the motion blob from FIG. 7(b), no search may be performed at all, or a search around a reduced neighborhood centered at (0,0) is performed. In summary, the motion direction estimation module takes the final motion mask and intermediate motion masks output by the motion detection module and estimates a pixel- (or block-) wise displacement value equal to $(-d_x, -d_y)$ (or, more generally, any vector descriptive of the relative displacement between the intermediate motion masks) at locations where the final motion mask is nonzero, and pixel- (or block-) wise displacements of (0,0) elsewhere. When the motion mask has multiple motion blobs, different displacements may be computed for different blobs, each displacement being computed from the relative displacement of the corresponding intermediate motion masks. For example, when there are N motion blobs in the motion mask, displacements $(-d_{x1}, -d_{y1}), \ldots, (-d_{xN}, -d_{yN})$ can be computed and used independently in the motion compensation process for blocks corresponding to each of the blobs.

Figure 9A:
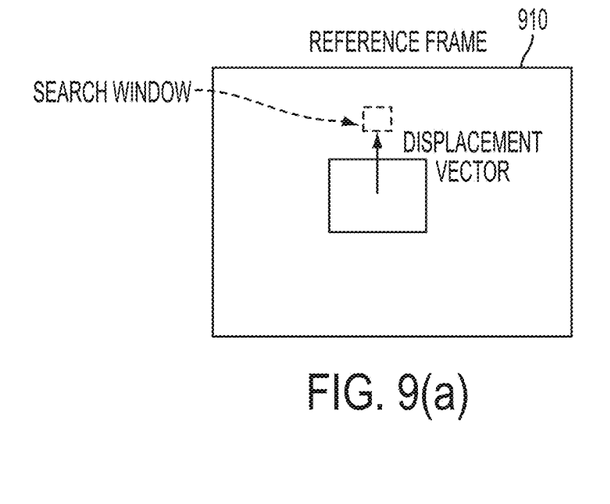
Figure 9B:
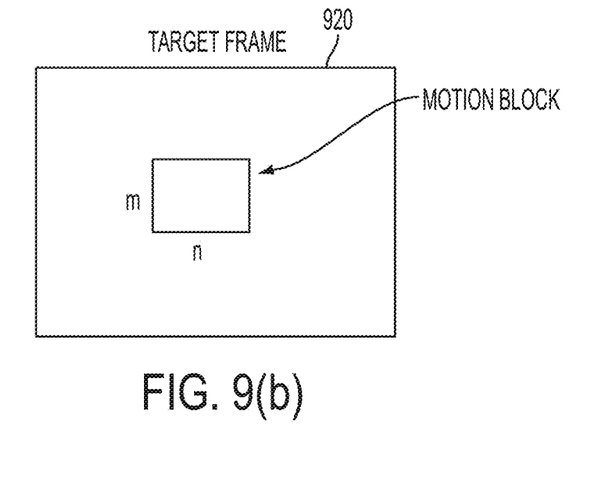

Unlike traditional motion estimation processes (as described in the introduction) which usually consider symmetric search neighborhoods around the target block (see FIG. 3), the motion estimation module in the proposed system greatly reduces the size of the search neighborhood by centering it at the location indicated by the pixel- (or block-) wise displacement values estimated by the motion direction and magnitude estimation module. The idea is to perform searches across greatly reduced neighborhoods based on the estimated characteristics of the apparent motion, as illustrated by the reference frame 910 and target frame 920 in FIG. 9, when compared to the frames in FIG. 3. Note that one important advantage of the proposed algorithm is that the magnitude of the motion vectors in the resulting motion vector field is not bounded by the size of the search neighborhood. This is a desirable trait of a motion estimation algorithm that makes it adaptable to wide ranges of inter-frame motion. To illustrate this point, consider the motion vector field from FIG. 4(c), where the search range was ±64 pixels along each direction. This means that the largest possible value of any given component (horizontal or vertical) of any motion vector is 64. The displacement estimated by the motion direction estimation module was in the order of 35 pixels along each direction. This means that the use of search ranges smaller than 35 pixels would cripple the ability to capture the nature of the true underlying motion. Had we chosen a smaller search range to compute the motion vector field from FIG. 4(c), for example, 32 pixels, the components of the motion vectors would have been bounded by 32 and, consequently, would have not been able to capture the right degree of motion in the scene. In other words, the size of the search neighborhood of a traditional motion estimation algorithm should be set at a value that is large enough to encompass the widest range of expected motion in the scene, which, in turn, determines the computational complexity of the algorithm: larger search neighborhoods will result in increased computational complexity. In the case of the system and method presented herein, computational complexity not only reduces significantly compared to that of the traditional method, but also remains more or less constant regardless of the expected range of motion since the location of the search neighborhoods is determined in an adaptive manner.

The proposed algorithm was tested on a video sequence acquired at a highway. The acquired video has a spatial resolution of 1728×2304 pixels (4 Mpixel) and a frame rate of 60 fps. The motion estimation block size was chosen as 16×16 pixels, making it compatible with both H.263 and H.264. The performance of the algorithm relative to reconstruction error (i.e., how similar the predicted frame composed by filing matching blocks is to the target frame).

Figure 10:
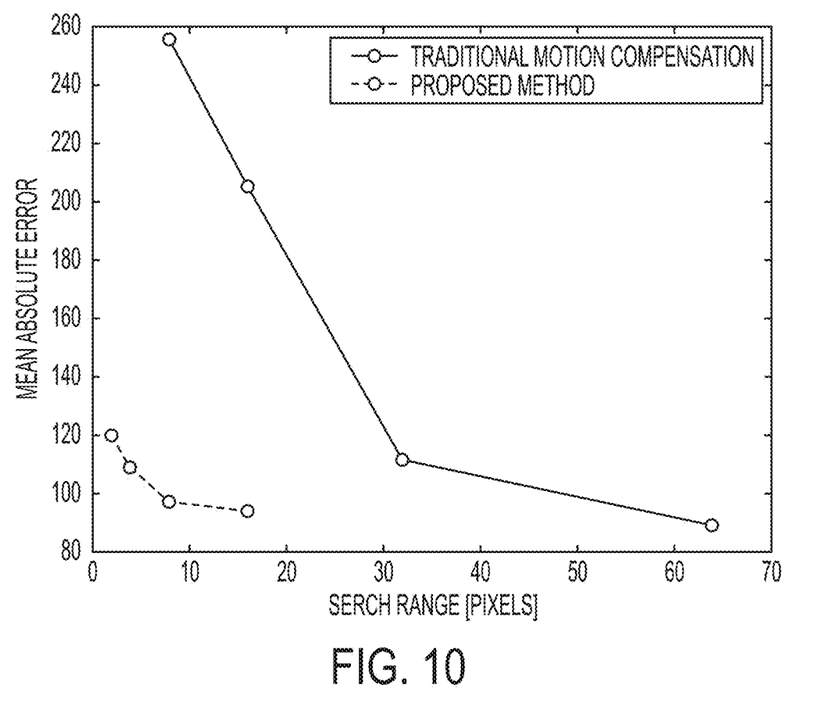
FIG. 10 illustrates a graph for reconstruction capabilities of the proposed algorithm and the traditional motion compensation algorithm.
Figure 11:
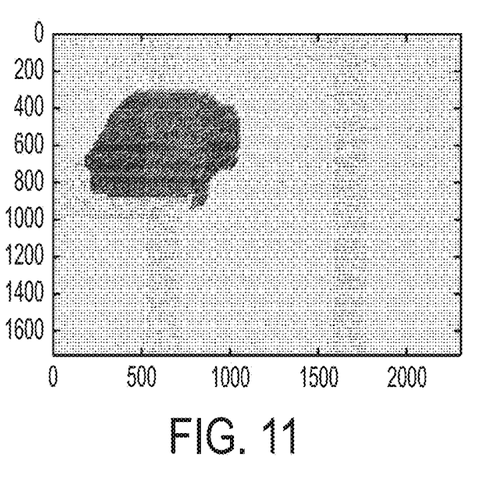
FIG. 11 illustrates a motion vector field computed by the proposed algorithm.

FIG. 10 illustrates the resulting average Mean Absolute Error between the predicted frame and the target frame as a function of search range. Search ranges of ±8, 18, 32, and 64 pixels were used for the traditional motion compensation algorithm, while ranges of ±2, 4, 8, and 16 pixels were used for the proposed method. If can be seen that the reconstruction performance of the proposed method matches/exceeds that of the traditional method for search ranges 4 times smaller. In addition, as illustrated by FIG. 11, the motion vector field produced by the proposed algorithm is more semantically meaningful than that of FIG. 3(c).

Since the present invention utilizes apparent motion of object(s) in the scene to improve the computation of video compression, the motion vectors derived would naturally represent the motion of object (i.e., has sematic meaning. This is different from traditional motion estimation methods, where the derived motion vectors may or may not represent the motion of object. Our method can thus be advantageously incorporated into systems with applications that require the detection of object motion such as the following:

Video compression and decompression that enable efficient vehicle event-driven searches;
Vehicle counting from compressed video streams;
Stop sign and traffic light law enforcement from compressed video streams;
Video-based vehicle speed estimation from compressed video streams;
Video-based vehicle classification from compressed video streams;
Right turn on bus lanes law enforcement for passenger vehicles from compressed video streams; and
Efficient, learning-based motion estimation in regularized environments.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A system for block-based motion estimation of video, comprising:
a computer including a motion detection module detecting apparent motion of objects in a scene in said video including initially estimating local patterns of motion based on incoming video frames of said video;
a motion direction and magnitude prediction module included in the computer for estimating direction and magnitude of the motion of the objects detected in said scene of said video to be in motion by the motion detection module;
a block-based motion estimation module included in the computer for performing searches in reduced neighborhoods of a reference block displaced from the target block according to the estimation of motion by the motion direction and magnitude prediction module, wherein said block-based motion estimation module reduces a size of a search neighborhood by centering said search neighborhood at a location indicated by a block-wise displacement value estimated by said motion direction and magnitude prediction module; and
a frame reconstruction, entropy coding module that processes said video after said video with said scene is subject to processing by said motion direction and magnitude prediction module and said block-based motion estimation module wherein said video is displayable via a monitor after processing of said video by said frame reconstruction, entropy coding module and is storable as data within a database.

2. The system for block-based motion estimation of video of claim 1, said computer conducting compression by rendering an estimate of the direction and magnitude of motion for objects in the scene and predicting search direction and neighborhood location for motion vectors.

3. The system for block-based motion estimation of video of claim 2, wherein motion estimation is performed by the system for the blocks determined to be in motion by the motion detection module.

4. The system for block-based motion estimation of video of claim 1, further comprising associating the system with a stationary camera to monitor video of a scene.

5. The system for block-based motion estimation of video of claim 2, wherein at least two stages are invoked to provide information relevant to the motion estimation module about apparent motion characteristics in the scene, said at least two stages including a) performance of motion detection for all blocks and b) estimation of direction of the detected motion.

6. The system of claim 5 wherein motion detection for all blocks is performed via a temporal frame differencing technique.

7. The system for block-based motion estimation of video of claim 1, wherein limited or no search ranges are applied by the system for regions of the scene that have little or no apparent motion.

8. The system for block-based motion estimation of video of claim 1, wherein multiple levels of thresholding are applied by the system to create layers of regions for a scene, each region with its own corresponding apparent motion.

9. The system for block-based motion estimation of video of claim 1, wherein multiple regions of the scene are detected to be in motion, each region with its own corresponding apparent motion.

10. A method ter block-based motion estimation of video, comprising:
providing a computer associated with a camera and including a motion detection module, a motion direction and magnitude prediction module and a block-based motion estimation module, and a frame reconstruction, entropy coding module, wherein said camera provides video to said computer for processing;

said motion detection module detecting apparent motion of objects in a scene of video captured by the camera wherein said detecting said apparent motion of said objects in said scene of said video includes initially estimating local patterns of motion based on incoming video frames of said video;

said motion direction and magnitude prediction module estimating direction and magnitude of the objects detected in said scene in said video to be in motion by the motion detection module;

said block-based motion estimation module performing searches in reduced neighborhoods of a reference block displaced from the target block according to an estimation of motion by the motion direction and magnitude prediction module, wherein said block-based motion estimation module reduces a size of a search neighborhood by centering said search neighborhood at a location indicated by a block-wise displacement value estimated by said motion direction and magnitude prediction module; and said frame reconstruction, entropy coding module processing said video after said video with said scene is subject to processing said motion direction and magnitude prediction module and said block-based motion estimation module wherein said video is displayable via a monitor after processing of said video by said frame reconstruction, entropy coding module and is storable as data within a database.

11. The method for block-based motion estimation of video of claim 10, wherein said computer conducts compression by rendering an estimate of the direction and magnitude of motion for objects in the scene and predicting search direction and neighborhood location for motion vectors.

12. The method for block-based motion estimation of video of claim 11, wherein motion estimation is performed by the method for the blocks determined to be in motion by the motion detection module.

13. The method for block-based motion estimation of video of claim 11, further comprising associating the method with a stationary camera to monitor motion in a scene.

14. The method for block-based motion estimation of video of claim 11, wherein two stages are invoked to provide information relevant to the motion estimation module about apparent motion characteristics in the scene, said two states including a) performance of motion detection for all blocks and b) estimation of direction of the detected motion.

15. The method for block-based motion estimation of video of claim 11, wherein limited or no search ranges are applied by the system for regions of the scene that have little or no apparent motion.

16. The method for block-based motion estimation of video of claim 11, wherein multiple levels of thresholding are applied by the system to create layers of regions for a scene, each region with its own corresponding apparent motion.

17. A method for estimating the motion of video, comprising:

capturing video using a camera;

providing the video to a computer associated with the camera, said computer further comprising a motion detection module, a motion direction and magnitude prediction module, and a block-based motion estimation module;

detecting apparent motion of objects in a scene of said video captured by the camera using said motion detection module, wherein said detecting said motion of said objects in said scene of said video further comprises initially estimating local patterns of motion based on incoming video frames of said video;

estimating direction and magnitude of the objects detected in said scene in said video to be in motion by the motion detection module using said motion direction and magnitude prediction module;

performing searches in neighborhoods of a reference block displaced from a target block according to an estimation of motion by the motion direction and magnitude prediction module using said block-based motion estimation module, wherein said block-based motion estimation module reduces a size of a search neighborhood by centering said search neighborhood at a location indicated by a block-wise displacement value estimated by said motion direction and magnitude prediction module; and perform a frame reconstruction and entropy coding with respect to said video after said video with said scene is subject to said estimating and said performing said searches in said neighborhoods of said reference block displaced from said target block.

18. The method for block-based motion estimation of video of claim 17, wherein said computer conducts compression by rendering an estimate of the direction and magnitude of motion for objects in the scene and predicting search direction and neighborhood location for motion vectors.

19. The method for block-based motion estimation of video of claim 17, wherein motion estimation occurs by the system for the blocks determined to be in motion by the motion detection module.

20. The system for block-based motion estimation of video of claim 17, wherein limited or no search ranges are applied by the system for regions of the scene that have little or no apparent motion.

* * * * *